Dec. 5, 1967

P. E. BEAM, JR 3,355,883

CLOSED LOOP HEAT EXCHANGER FOR A GAS TURBINE ENGINE

Filed Jan. 24, 1966

INVENTOR.
Paul E. Beam, Jr.
BY
F. J. Fodale
ATTORNEY

Dec. 5, 1967    P. E. BEAM, JR    3,355,883
CLOSED LOOP HEAT EXCHANGER FOR A GAS TURBINE ENGINE
Filed Jan. 24, 1966    2 Sheets-Sheet 2

INVENTOR.
Paul E. Beam, Jr.
BY
F. J. Fodale
ATTORNEY

United States Patent Office 3,355,883
Patented Dec. 5, 1967

3,355,883
CLOSED LOOP HEAT EXCHANGER FOR A GAS TURBINE ENGINE
Paul E. Beam, Jr., Indianapolis, Ind., assignor to General Motors Corporation, Detroit, Mich., a corporation of Delaware
Filed Jan. 24, 1966, Ser. No. 522,569
9 Claims. (Cl. 60—39.51)

ABSTRACT OF THE DISCLOSURE

A closed loop heat exchanger which transfers heat from the turbine section to the compressor section of a gas turbine engine. The heat exchange medium is an electrically conductive fluid such as sodium. A portion of the loop is rotated with respect to and in the proximity of a magnet thus providing an electromagnetic pump for circulating the heat exchange medium around the loop. In the first embodiment, the magnet is fixed while the loop portion is rotated with the gas turbine drive shaft. In the second embodiment, the loop portion is stationary and the magnet is rotated with the drive shaft.

---

My invention relates generally to a closed loop heat exchanger and more specifically to a closed loop heat exchanger utilizing an electrically conductive fluid as a heat transfer medium and having a magnetic pump to circulate the transfer medium through the loop. My invention is especially suitable for but not limited to use with a gas turbine engine.

The efficiency and power rating of a given gas turbine engine can be increased by operating the turbine at a higher temperature level and/or adding a regenerative cycle to the gas turbine thermodynamic cycle. Present day turbines, however, operate at temperature limits of the materials used in the turbine. Thus, for a turbine of presently available materials, the operating temperature can only be increased by providing cooling for the heat sensitive parts of the turbine which could be either rotatable or stationary. The cooling system which has the least performance penalties associated with it is a closed loop heat transfer circuit in which heat is absorbed at the turbine section and dumped in the aft portion of the compressor section. The addition of heat to compressed air at this point not only minimizes performance penalties but may also be beneficial in some instances in that the added heat gives a regenerative effect to the basic engine thermodynamic cycle.

The weak point of the closed heat transfer circuit is that of driving or pumping the fluid. A pump usually encompasses expensive, complicated machinery with moving parts and valving thus introducing maintenance and leakage problems. It is desirable to have a closed heat transfer circuit which can be hermetically sealed to avoid leakage problems and which utilizes a pump simple in design and containing a minimum of moving parts. A magnetic pump fulfills both these aims since the only moving part is a rotating magnet and no mechanical interconnection between the pump and the heat transfer circuit is required. The only connection between the pump and the closed loop is magnetic, that is, some part of the closed circuit must be within the magnetic field of the magnet. The heat transfer loop thus being only magnetically coupled to the pump and, therefore, structurally independent, can easily be hermetically sealed.

Accordingly, my invention is directed toward providing a closed loop heat exchanger for transferring heat which is easily sealed against leakage and in which the heat transfer medium is circulated simply and efficiently. My invention is also directed toward providing such a system which is especially suitable for heat transfer between either the rotating or non-rotating parts of the turbine and compressor section of a gas turbine engine. In its broadest aspects, my heat exchanger can be used to either cool the turbine, add a regenerative effect adjacent the compressor outlet or both depending on the design requirements of a particular engine.

Other objects and advantages of the invention will be more fully apparent from the following description of the annexed drawings, which illustrate preferred embodiments, and wherein.

Figure 1:
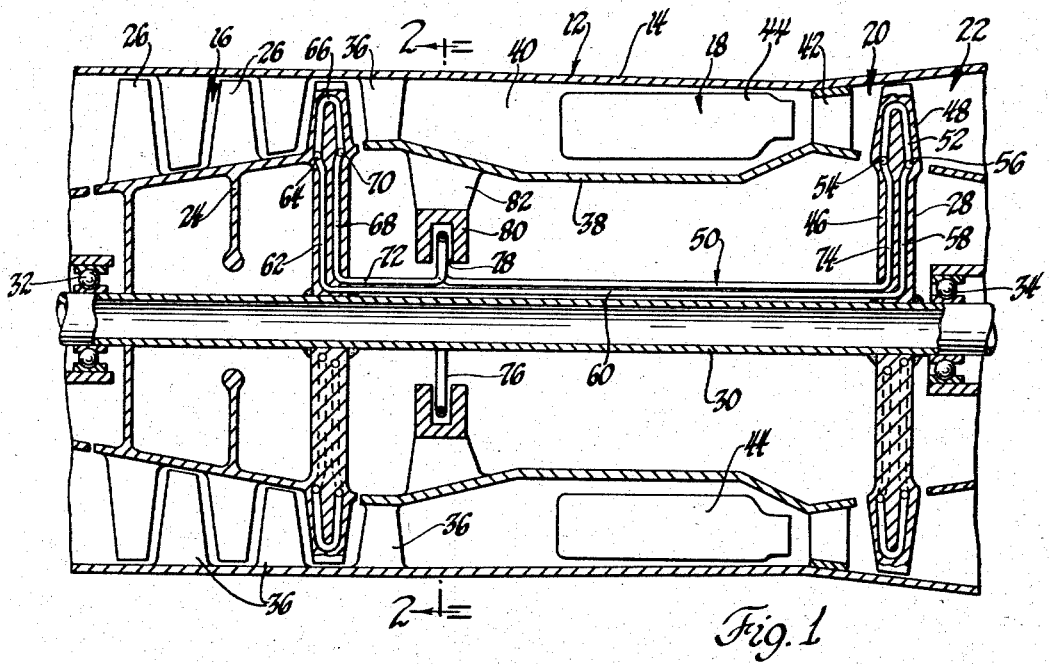
FIGURE 1 is a longitudinal schematic section of a typical gas turbine engine employing a heat exchanger in accordance with my invention as applied between the rotating parts of the turbine and compressor.

Referring now to FIGURE 1 in detail, I have shown a gas turbine engine 12 having a compressor 16, a combustor 18, a turbine 20, and an exhaust 22 in axial alignment within a casing 14. The compressor 16 consists of a drum type rotor 24 having a number of blade rows 26 and drivingly connected to a turbine rotor 28 by a shaft 30. The shaft 30 is journaled in bearings 32 and 34 mounted in the casing 14 at its forward and aft ends, respectively. The compressor 16 also includes a number of stator vane rows 36 which project inwardly from the casing 14 and are interleaved between the compressor blade rows 26. The final row or vane ring 36 mounts an annular wall 38 which defines an annular gas passage 40 through the combustor 18. A number of circumferentially spaced combustor cans 44 are located in the passage 40. The aft end of the annular wall 38 is supported within the casing 14 by an inlet nozzle vane ring 42 for the turbine rotor 28. The turbine rotor 28 consists of the usual wheel 46 and radially extending blades 48.

Figure 2:
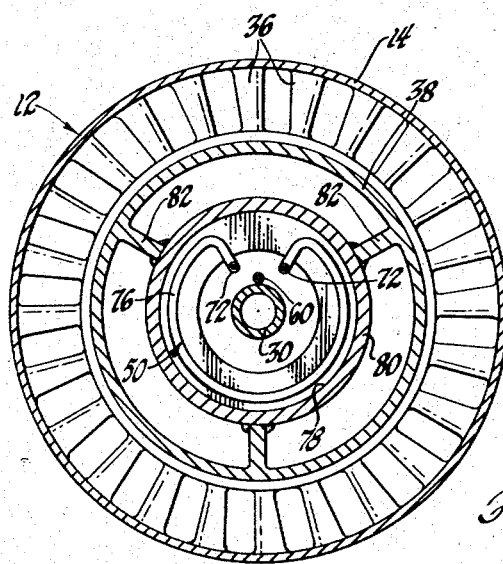
FIGURE 2 is a section taken along the line 2—2 of FIGURE 1 and looking in the direction of the arrows.

The heat exchange loop which forms a part of my invention is indicated generally at 50. Starting with the turbine rotor 28, it is seen that each blade 48 has a U-shaped passage 52. The open ends of each of these passages communicate with inlet and outlet manifolds 54 and 56, respectively, located in the periphery of the wheel 46. The outlet manifold 56, in turn, communicates with a radial passage 58 in the wheel 46 which is connected to a radial passage 62 in the aft wall of the compressor rotor drum 24 by an axial conduit 60. The passage 62 leads to an inlet manifold 64 in the rim of compressor drum 24. Each blade in the downstream compressor row is also seen to include a U-shaped passage 66, one open end of which communicates with the manifold 64. The other ends of the passages 66 are connected to a second radial passage 68 in the compressor rotor 24 through a manifold 70. A second conduit 72 extends axially from the passage 68 in the compressor rotor to a second radial passage 74 in the turbine rotor 46 which returns to the manifold 54 to complete the heat transfer circuit. At a point between its ends, the conduit 72 is bent around into an almost circular form as best illustrated in FIGURE 2. This bent circular portion 76 lies in a plane perpendicular to the axis of rotation of the shaft 30 and is disposed within an inwardly opening annular groove 78 of an annular magnet 80. The magnet 80 is supported from the annular wall 38 by a number of struts 82. The magnet 80 is thus fixed with respect to the casing 14 while the heat exchange circuit 50 is rotatable with the compressor rotor 26, the turbine 28, and the shaft 30. The conduit 50 contains an electrically conductive heat exchanger fluid such as liquid sodium.

In operation, air is compressed, ignited, and expanded through the turbine to drive it which, in turn, drives the compressor. The heat transfer loop 50 also rotates with the drive train. The magnet 80 being fixed, as the conduit portion 76 rotates within its magnetic field, a pumping action is imparted to the electrically conductive liquid sodium so that it circulates through the closed loop 50. As the liquid circulates, it absorbs heat from the turbine blades 48 to cool them and dumps this heat to the compressor discharge air through downstream compressor blade row 26. The addition of heat at this point gives a regenerative effect to the engine thermodynamic cycle.

In the first embodiment of my invention, I have shown a closed loop heat exchanger for transferring heat between the rotating parts of a turbine and compressor of a gas turbine engine which is easily sealed and in which the heat transfer medium is circulated simply and efficiently.

Figure 3:
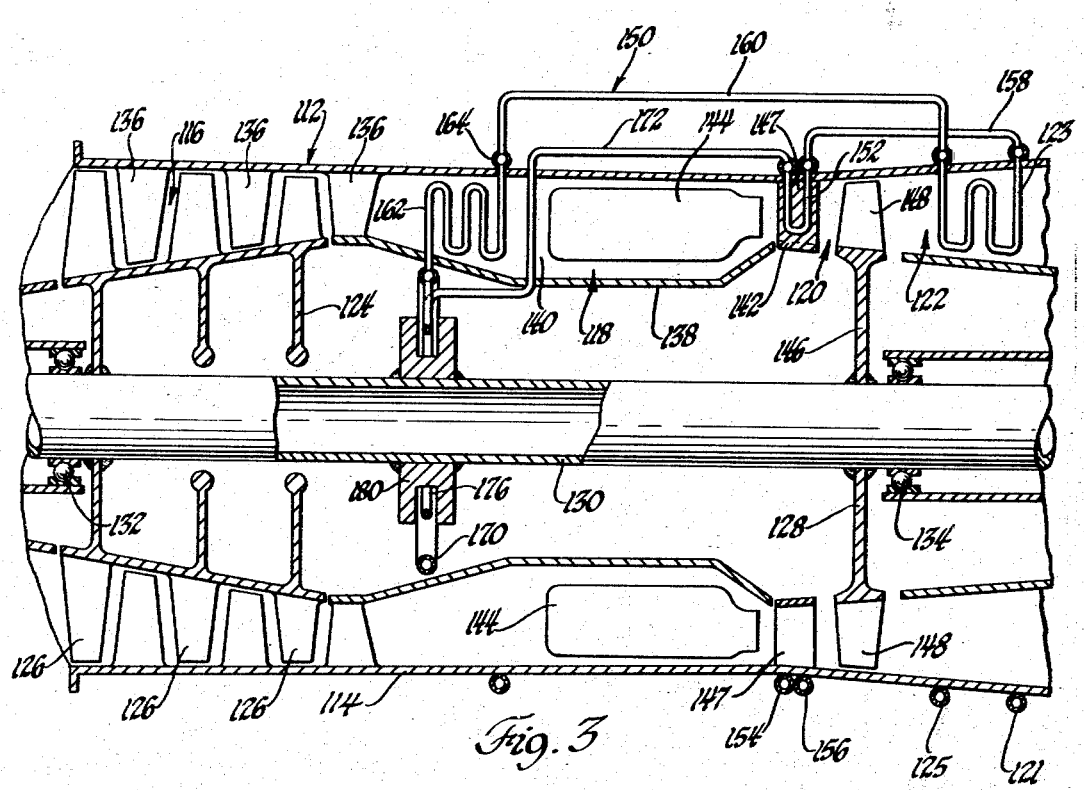
FIGURE 3 is a longitudinal schematic section of a typical gas turbine engine employing a heat exchanger in accordance with a second embodiment of my invention as applied between the non-rotating parts of the turbine and compressor.

Referring now to FIGURE 3 in detail, I have shown another typical gas turbine engine 112 having a compressor 116, a combustor 118, a turbine 120, and an exhaust 122 in axial alignment within a casing 114. The compressor 116 consists of a drum type rotor 124 having a number of blade rows 126 and which is drivingly connected to a turbine rotor 128 by a shaft 130. The shaft 130 is journaled in bearings 132 and 134 mounted in the casing 114 at its forward and aft ends, respectively. The compressor 116 also includes a number of stator vane rows 136 which project inwardly from the casing 114 and are interleaved between the compressor blade rows 126. The final row or vane ring 136 mounts an annular wall 138 which defines an annular gas passage 140 through the combustor 118. A number of circumferential spaced combustor cans 144 are located in the passage 140. The aft end of the annular wall 138 is centrally supported in the casing 114 by an inlet nozzle vane ring 142 for the turbine 128. The turbine rotor 128 consists of the usual wheel 146 and radially extending blades 148.

The heat exchange loop which forms a part of this second embodiment of my invention is indicated generally at 150. Starting with the turbine 120, it is seen that each vane 147 in the nozzle vane ring 142 has a U-shaped passage 152. The open ends of each of these passages communicate with inlet and outlet manifolds 154 and 156, respectively. The outlet manifold 156, in turn, communicates with one or more axial conduits 158 which are connected to a second inlet manifold 121 surrounding the exhaust portion of the casing 114. A set of circumferentially spaced sinuous conduits 123 is disposed in the exhaust duct and is connected through a second outlet manifold 125, one or more axial conduits 160, and a third inlet manifold 164 to a second set of circumferentially spaced, sinuous conduits 162 disposed in the compressor outlet behind the final vane ring 136. The outlets of the sinuous conduits 162 are connected through a manifold 170 to a particircular conduit 176. A view of the particircular conduit 176 taken on a plane perpendicular to the axis of shaft 130 is much the same as that of conduit 76 as shown in FIGURE 2. The conduit 176, however, is disposed in an outwardly opening circumferential groove in an annular magnet 180 which is secured to the shaft 130. An axial extension 172 connects the outlet of conduit 176 to inlet manifold 154 to complete the heat transfer circuit. The heat transfer circuit 150 contains an electrically conductive heat exchanger fluid, such as liquid sodium.

In operation, air is compressed, ignited, and expanded through the turbine to drive it which, in turn, drives the compressor through shaft 130. The magnet 180 being mounted on shaft 130 also rotates with the drive train. The heat transfer circuit 150 being fixed, there is relative motion between the magnet 180 and the particircular conduit 176 which lies within its magnetic field. Since there is relative motion between the conduit 76 and the magnetic field, a pumping action is imparted to the electrically conductive liquid sodium so that it circulates through the closed loop 150. As the liquid circulates, it absorbs heat from the turbine nozzle vanes 142 to cool them. Additional heat is absorbed from the exhaust gases through corrugated conduits 123. All of the absorbed heat is dumped to the compressor discharge air through the corrugated conduits 162.

In the FIGURE 3 embodiment, I have shown by invention as applied between the non-rotating parts of a gas turbine engine. My second embodiment gives more of a regenerative effect than the first because a set of corrugated conduits has been included in the exhaust section to pick up additional heat from the exhaust gases. If this added heat is not desired, the system may obviously be modified by omitting the conduits 123, and manifolds 121 and 125, and by connecting conduit 158 directly to conduit 160. Likewise, other modifications are readily discernible. For instance, the number of vanes in ring 142, corrugated conduits 123 and 162 could be matched thus eliminating the need for manifolds 121, 125, 156, and 164. Of course, the number of conduits 158 and 160 would also have to be matched. The conduits 162 and 123 could be shielded in hollow vane-like elements, or conduits 162 could be housed in hollow vanes for row 136.

Obviously, many other modifications can be made to both of the embodiments shown for the purposes of illustration without departing from the spirit and scope of the invention as defined in the appended claims.

I claim:

1. A heat exchanger for a gas turbine engine having a casing with a compressor, a combustor, a turbine drivingly connected to said compressor, and an exhaust in axial alignment therein comprising, in combination: a magnet carried by said gas turbine engine, a closed loop heat transfer circuit, said closed circuit having a first portion disposed within the magnetic field of said magnet, a second portion located in said compressor and a third portion located in said turbine, an electrically conductive liquid contained in said closed loop circuit, and means to cause relative rotation between said magnet and said conduit whereby said electrically conductive fluid is circulated through said closed loop conduit to transfer heat from said turbine to said compressor.

2. The heat exchanger as defined in claim 1 wherein said magnet is an annulus fixed on said casing and having a central inwardly opening circumferential groove and wherein said closed loop circuit is rotatably mounted in said casing with said first portion being disposed in said groove.

3. The heat exchanger as defined in claim 2 wherein said second portion of said circuit is disposed in the rotor of said compressor and said third portion of said circuit is disposed in the rotor of said turbine.

4. The heat exchanger as defined in claim 1 wherein said magnet is an annulus drivingly connected to said turbine and having an outwardly opening circumferential groove, and wherein said circuit is fixed on said casing, said first portion of said circuit being disposed within said groove.

5. The heat exchanger as defined in claim 4 wherein said closed loop circuit includes a fourth portion disposed in said exhaust.

6. The heat exchanger as defined in claim 4 wherein said third portion of said circuit is disposed in the inlet nozzle vane row for said turbine.

7. The heat exchanger as defined in claim 5 wherein said third portion of said circuit is disposed in the inlet nozzle vane row for said turbine.

8. The heat exchanger as defined in claim 6 wherein said second portion of said circuit is disposed in said compressor outlet.

9. The heat exchanger as defined in claim 7 wherein said second portion of said circuit is disposed in said compressor outlet.

References Cited

UNITED STATES PATENTS

| 2,655,107 | 10/1953 | Godbold | 103—1 |
| 2,686,474 | 8/1954 | Pulley | 103—1 |
| 2,756,678 | 7/1956 | Collins | 103—1 |
| 2,848,409 | 8/1958 | Szechtman | 103—1 X |

CARLTON R. CROYLE, *Primary Examiner.*